(12) United States Patent
Venkatakrishnappa et al.

(10) Patent No.: US 9,816,489 B2
(45) Date of Patent: Nov. 14, 2017

(54) WIND TURBINE TOWER HAVING FLOATING PLATFORM

(71) Applicant: General Electric Company, Schenectady, NY (US)

(72) Inventors: Raghunandan Chickballapur Venkatakrishnappa, Bangalore (IN); Umesh B. Shingne, Achalpur (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1142 days.

(21) Appl. No.: 13/954,048

(22) Filed: Jul. 30, 2013

(65) Prior Publication Data

US 2015/0037166 A1 Feb. 5, 2015

(51) Int. Cl.
*F03D 80/80* (2016.01)
*F03D 80/50* (2016.01)

(52) U.S. Cl.
CPC ............ *F03D 80/88* (2016.05); *F03D 80/50* (2016.05); *F05B 2240/912* (2013.01); *Y02E 10/728* (2013.01)

(58) Field of Classification Search
CPC . F03D 9/35; F03D 13/20; F03D 80/00; F03D 80/80; F03D 80/88
USPC ....... 416/244 A, 244 R; 52/64, 167.4, 169.9, 52/246, 249, 274, 300
See application file for complete search history.

(56) References Cited

U.S. PATENT DOCUMENTS

| | | | | |
|---|---|---|---|---|
| 4,735,530 A | * | 4/1988 | Dommer | B23B 5/16 409/138 |
| 4,845,905 A | * | 7/1989 | Frank | E04D 13/0354 292/278 |
| 6,113,079 A | * | 9/2000 | Urbanski | B01D 3/20 202/158 |
| 7,290,759 B1 | * | 11/2007 | Lavrencik | F16F 15/08 267/140.11 |
| 8,839,586 B2 | * | 9/2014 | Edenfeld | E04H 12/34 49/33 |
| 9,057,205 B2 | * | 6/2015 | Reed | E04H 12/08 |
| 2002/0084142 A1 | * | 7/2002 | Brennan | B66B 9/187 182/133 |
| 2003/0015877 A1 | * | 1/2003 | Schlemenat | F03D 1/025 290/55 |
| 2003/0071187 A1 | * | 4/2003 | Herren | F16F 15/0275 248/638 |
| 2009/0016897 A1 | * | 1/2009 | Olgaard | E04H 12/08 416/244 R |
| 2009/0126309 A1 | * | 5/2009 | Lyness | E04H 12/00 52/650.3 |
| 2009/0211172 A1 | * | 8/2009 | Scholte-Wassink | F03D 1/001 52/40 |

(Continued)

*Primary Examiner* — Dwayne J White
*Assistant Examiner* — Su Htay
(74) *Attorney, Agent, or Firm* — Dority & Manning, PA

(57) ABSTRACT

Towers for wind turbines are provided. In one embodiment, a tower includes a hollow shell defining an interior, the hollow shell extending generally along a longitudinal axis. The tower further includes a platform disposed in the interior and connected to the shell. The platform includes a first plate fixedly connected to the shell. The platform further includes a second plate movably connected to the first plate such that relative movement of the first plate and second plate is permitted in a plane generally transverse to the longitudinal axis.

18 Claims, 6 Drawing Sheets

(56) References Cited

U.S. PATENT DOCUMENTS

| | | | |
|---|---|---|---|
| 2009/0218776 A1* | 9/2009 | Whitacre | B60G 7/02 |
| | | | 280/86.756 |
| 2012/0210668 A1* | 8/2012 | Kryger | E04H 7/22 |
| | | | 52/645 |
| 2012/0291833 A1* | 11/2012 | Hand | F03D 1/001 |
| | | | 136/244 |
| 2013/0174509 A1* | 7/2013 | Reed | E04H 12/08 |
| | | | 52/655.1 |
| 2016/0108896 A1* | 4/2016 | Jane Panella | E04B 1/40 |
| | | | 52/36.4 |

* cited by examiner

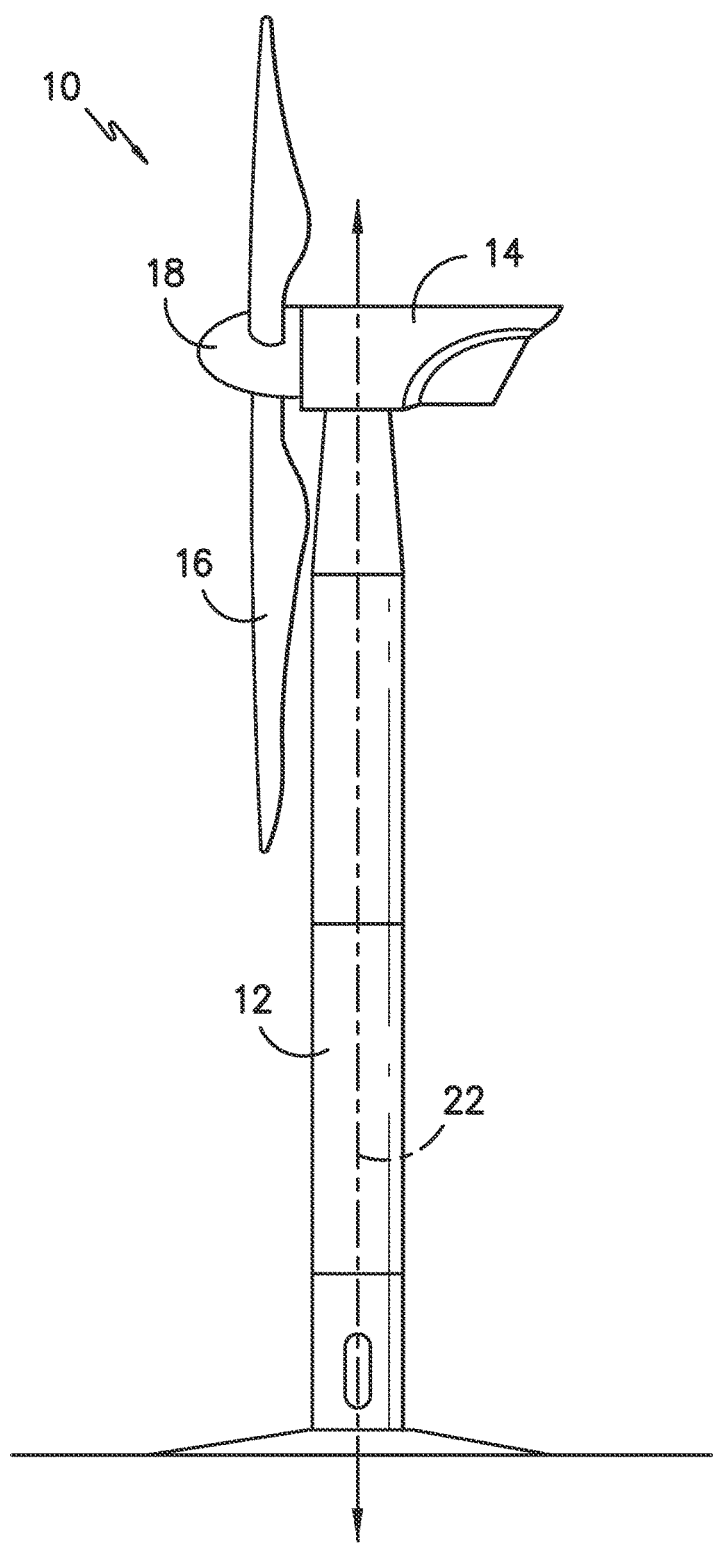
FIG. -1-
PRIOR ART

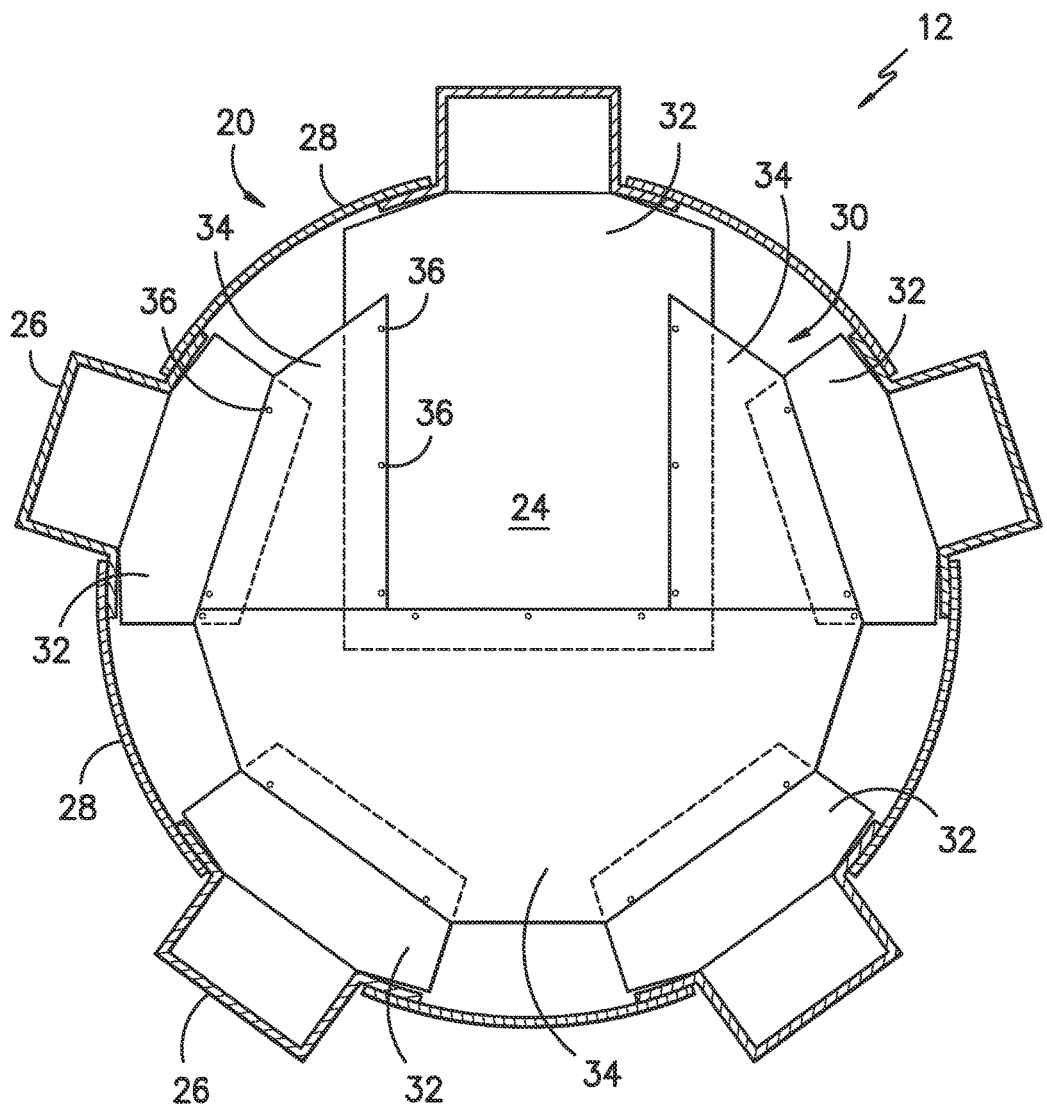
FIG. -2-

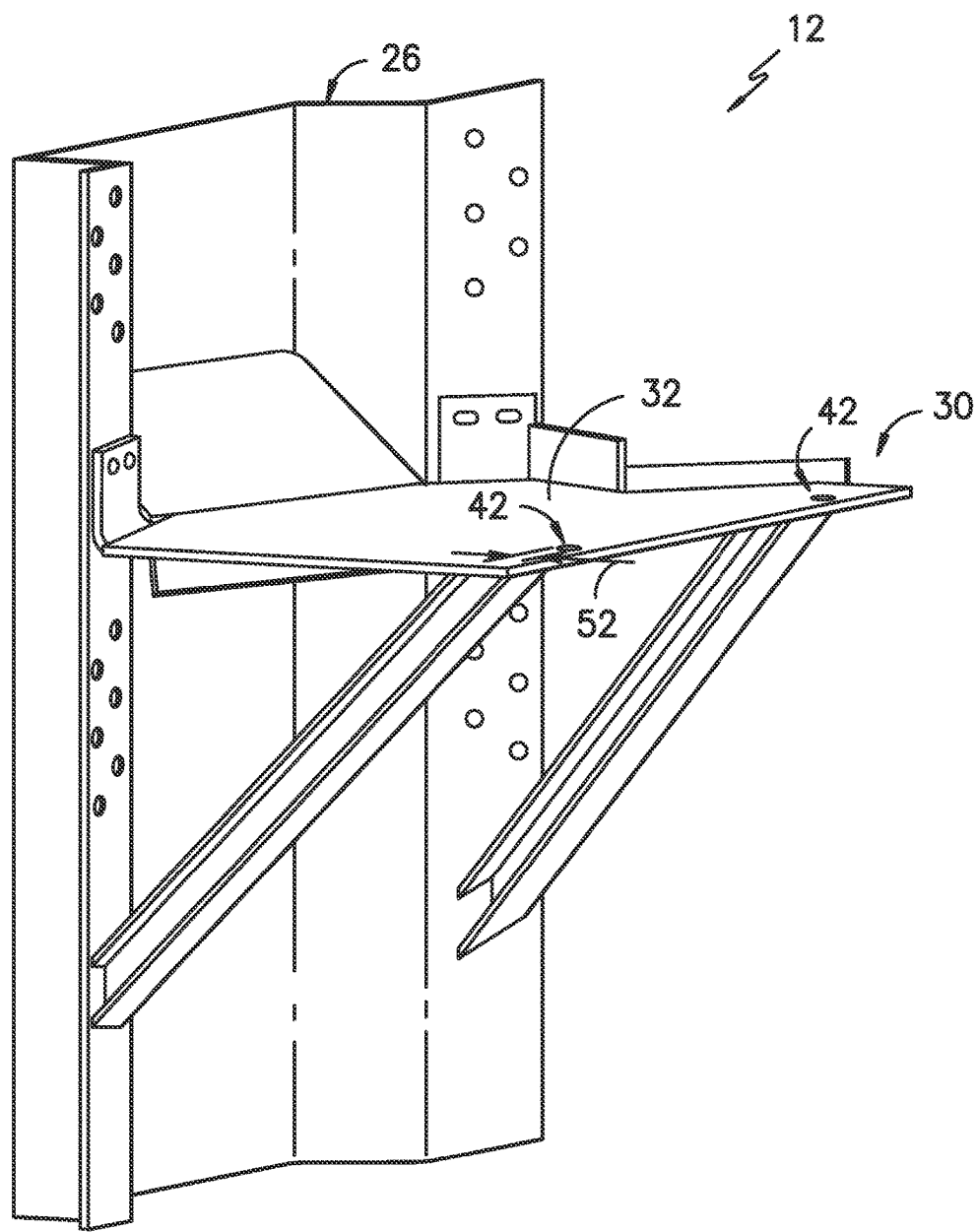
FIG. -3-

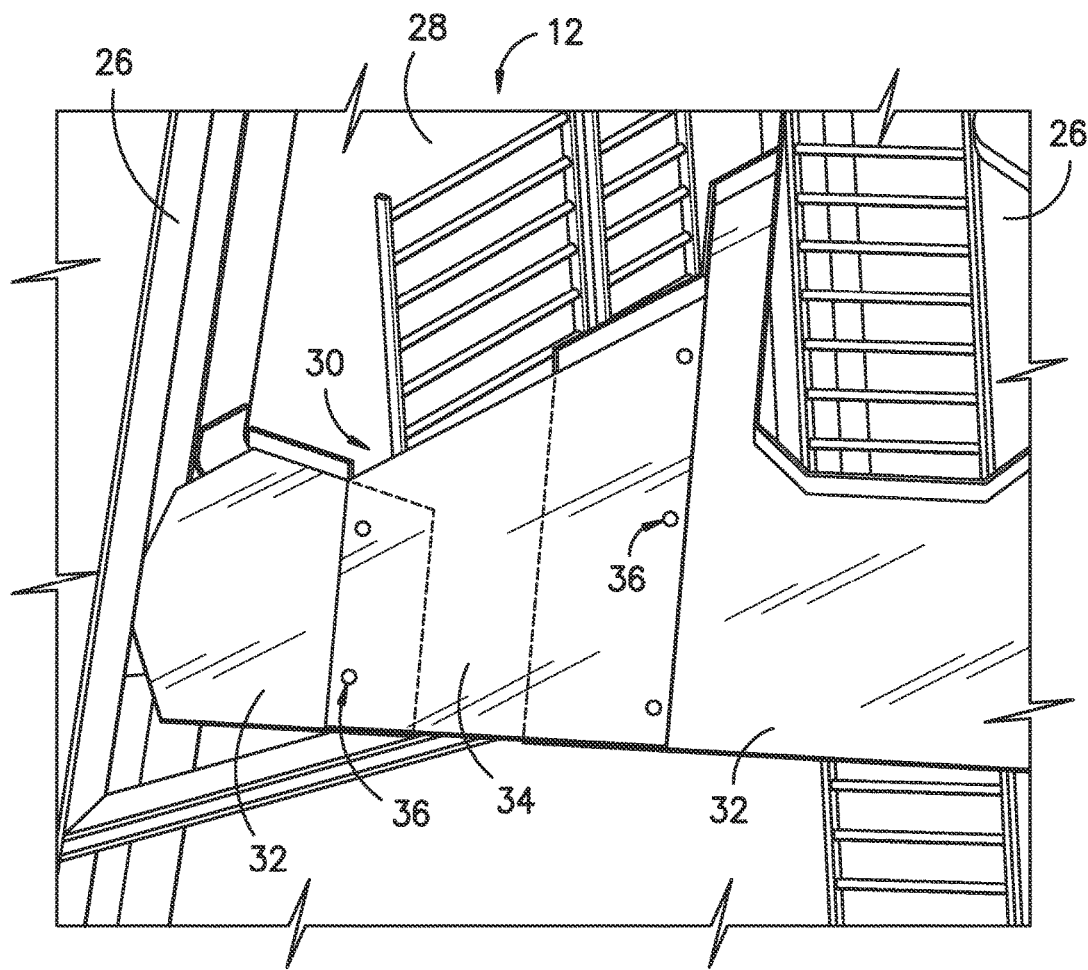
FIG. -4-

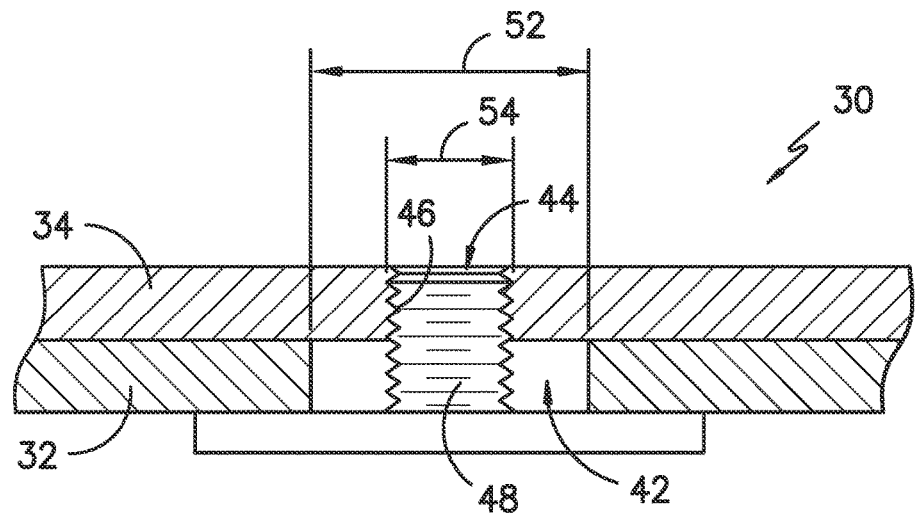
FIG. -5-
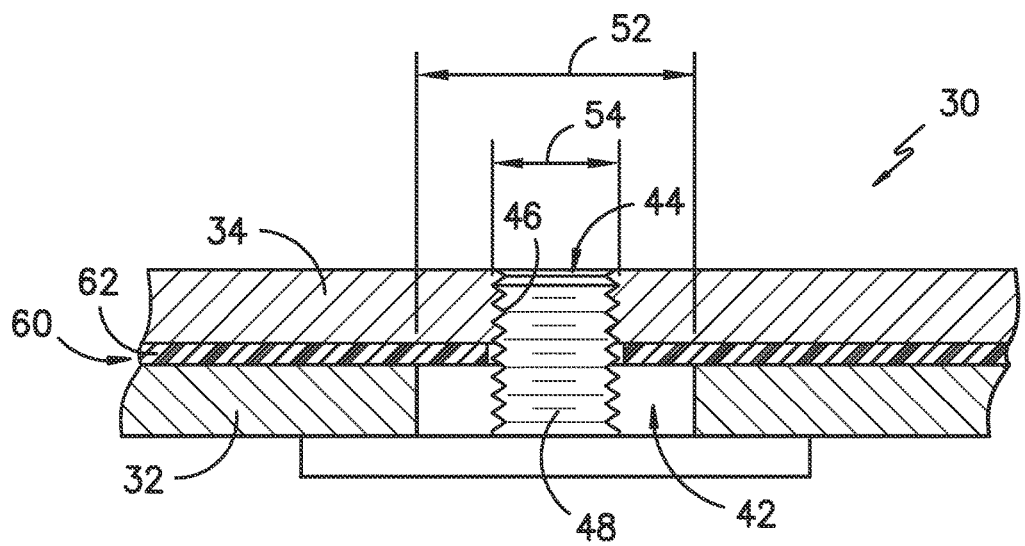
FIG. -6-

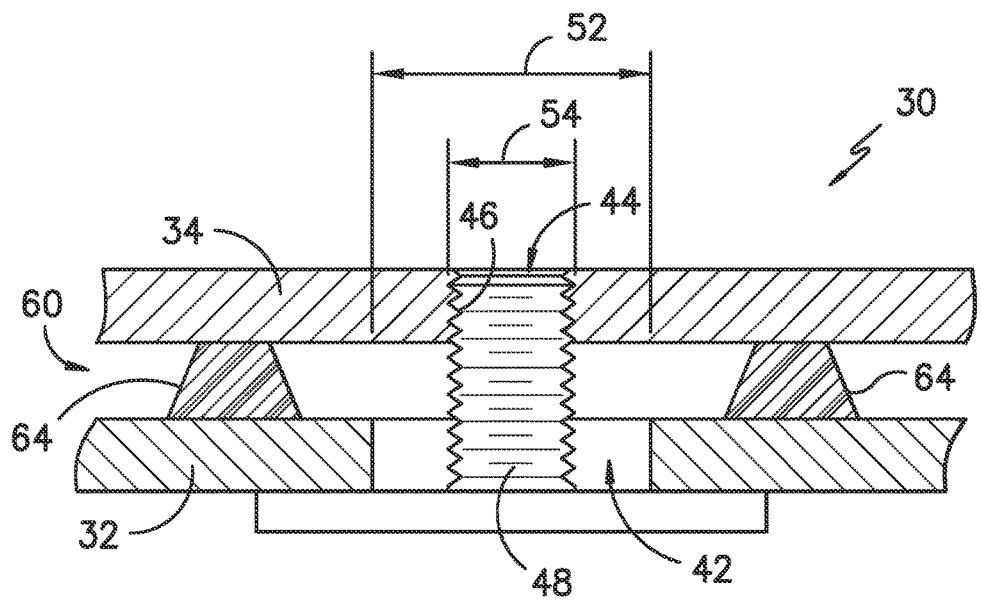
FIG. -7-
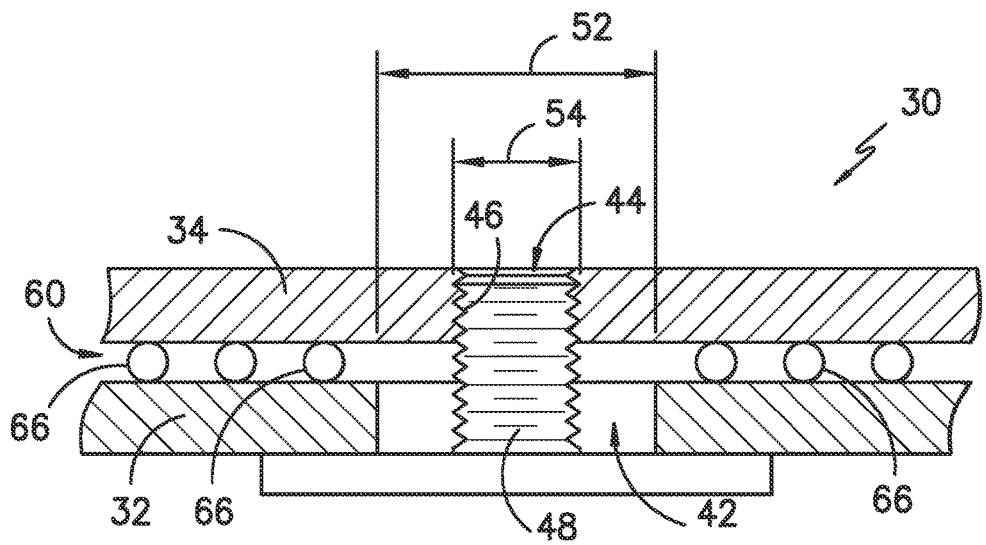
FIG. -8-

WIND TURBINE TOWER HAVING FLOATING PLATFORM

FIELD OF THE INVENTION

The present disclosure relates in general to wind turbines, and more specifically to wind turbine towers and platforms utilized in the towers.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation, the various components of a wind turbine experience various loads due to, for example, the speed of the wind and the interaction of the wind with the rotor blades and other components of the wind turbine. In particular, the tower may be subjected to various loads during operation. For example, the tower may be subjected to bending loads during operation as wind interacts with the rotor blades and the tower itself Such loading of the tower can subject various components of the tower to high stresses and, due to the intermittent nature of wind gusts, can fatigue the components.

Of particular concern are platforms contained within the interior of the tower. Movement of the tower can subject fixed platforms connected to the tower to experience high stresses. In towers formed from multiple legs, where the legs can move relative to one another and the platform is connected to multiple legs, such stressing of platforms is of increased concerns.

Accordingly, towers that reduce stresses during operation of the wind turbine are desired in the art. In particular, platform arrangements which reduce such stresses would be advantageous.

BRIEF DESCRIPTION OF THE INVENTION

Aspects and advantages of the invention will be set forth in part in the following description, or may be obvious from the description, or may be learned through practice of the invention.

In one embodiment, a tower for a wind turbine is disclosed. The tower includes a hollow shell defining an interior, the hollow shell extending generally along a longitudinal axis. The tower further includes a platform disposed in the interior and connected to the shell. The platform includes a first plate fixedly connected to the shell. The platform further includes a second plate movably connected to the first plate such that relative movement of the first plate and second plate is permitted in a plane generally transverse to the longitudinal axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a wind turbine according to one embodiment of the present disclosure;

FIG. 2 is a cross-sectional view of a wind turbine tower in accordance with one embodiment of the present disclosure;

FIG. 3 is a perspective view of a first plate fixedly connected to a leg of a tower shell in accordance with one embodiment of the present disclosure;

FIG. 4 is a top view of two first plates fixedly connected to legs of a tower shell and a second plate movably connected to the first plates in accordance with one embodiment of the present disclosure;

FIG. 5 is a cross-sectional view of a movable connection between a first plate and a second plate in accordance with one embodiment of the present disclosure;

FIG. 6 is a cross-sectional view of a movable connection between a first plate and a second plate in accordance with another embodiment of the present disclosure;

FIG. 7 is a cross-sectional view of a movable connection between a first plate and a second plate in accordance with another embodiment of the present disclosure; and FIG. 8 is a cross-sectional view of a movable connection between a first plate and a second plate in accordance with another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring now to FIG. 2, a cross-sectional view of one embodiment of a tower 12 is shown. The tower 12 generally includes a shell 20, which extends generally along a longitudinal axis 22 from a support surface, such as the ground or a foundation. As shown, the shell 20 may define an interior 24 of the tower 12.

In some exemplary embodiments, as shown in FIG. 2, a shell 20 may include a plurality of legs 26 and a plurality of walls 28. Any suitable number of legs 26 may be utilized. For example, while FIG. 2 illustrates one embodiment having five legs, two, three, four, six, seven, eight or more legs 26 may be utilized. Each wall 28 may be disposed between neighboring legs 26, and may be connected to these legs 26. Such connection is typically a fixed connection, such that relative movement between a wall 28 and leg 26 is generally prevented, and may be accomplished through the use of suitable mechanical fasteners, such as nut-bolt combinations, screws, rivets, etc., or through the use of welding, or through any other suitable connection apparatus or technique. The legs 26 and walls 28 may be connected together, as shown, to generally define the shell 20 and interior 24 thereof It should be understood, however, that the present disclosure is not limited to the above-disclosed tower 12 design. Rather, any suitable tower 12 formed from any suitable components and materials are within the scope and spirit of the present disclosure.

Referring now to FIGS. 2 through 4, a tower 12 according to the present disclosure may include one or more platforms 30 disposed in the interior 24. Each platform 30 may provide a location for the placement of other various internal components of the wind turbine 10, and may provide a walk- and work-space for workers performing operational or maintenance related activities in the wind turbine 10. Each platform 30 may thus be connected to the shell 20 at various locations on the shell along the longitudinal axis 22.

As further shown in FIGS. 2 through 8, a platform 30 according to the present disclosure may include movable features that allow the platform to float within the interior 24 of the tower 12, thus decreasing stresses and fatigue during operation of the wind turbine 10. A floating platform 30 according to the present disclosure thus allows for relative movement in a plane of the platform 30, which may generally be transverse to the longitudinal axis 22.

Thus, as shown, a platform 30 may include one or more first plates 32 and one or more second plates 34. A first plate 32 may be fixedly connected to the shell 20, such as through use of a suitable mechanical fasteners, or through the use of welding, or through any other suitable connection apparatus or technique. In some exemplary embodiments as shown, a first plate 32 may be fixedly connected to a leg 26 of the shell 20.

A second plate 34 may be movably connected to one or more first plates 32. Typically, a second plate 34 may be connected to at least two first plates 32, although it should be understood that a second plate 34 could be connected to one, three, four, or more first plates 32. The movable connection permits relative movement of the first plates 32 and second plates 34 in the plane that is generally transverse to the longitudinal axis 22. Thus, when the shell 20 experiences various loads, the relative movement of the first plates 32 and second plates 34 may compensate for such loading, thus decreasing stresses associated with such loading.

In exemplary embodiments, as shown, the movable connection of a first plate 32 and second plate 34 allows the first plate 32 to be movable relative to the second plate 34. For example, the first plates 32 may be fixedly connected to the shell 20, such as to the legs 26 in some embodiments. Thus, movement of a portion of the shell 20, such as a leg 26, to which a first plate 32 is connected may in turn cause movement of that plate 32. In order to reduce platform stresses, the first plates 32 may thus be allowed to move relative to the second plates 34.

As shown, in exemplary embodiments, one or more bolts 36 may be utilized to movably connect a second plate 34 to a first plate 32. Further, the connection of the bolts 36 to each plate may facilitate the relative movement of the plates. For example, as particularly shown in FIGS. 5 through 8, a bolt 36 may extend through a bore hole 42 defined in a first plate 32 and a bore hole 44 defined in a second plate 34. The bore hole 44 of the second plate 34 may include a plurality of inner threads 46 configured to mesh with a plurality of outer threads 48 of the bolt 36, such that the bolt 36 may be threadably coupled to this threaded bore hole 44. However, the bore hole 42 defined in the first plate 32 may have a diameter, such as a maximum diameter 52, which is greater than a diameter, such as a maximum diameter 54, of the bolt 36. Such increased diameter permits movement of the first plate 32 relative to the second plate 34 as discussed above.

It should be understood that the term "diameter" is not limited to the diameter of a circle or oval, and rather than such term should be construed as encompassing a width of any suitably shaped components, such as a bore hole or bolt.

In some further exemplary embodiments as shown in FIGS. 6 through 8, a lubrication layer 60 may be disposed between a first plate 32 and a second plate 34. The lubrication layer 60 may be operable to reduce friction between the first plate 32 and second plate 34 during relative movement of the first plate 32 and second plate 34. For example, in some embodiments, a lubrication layer 60 may be or include a suitable liquid, such as oil. In other embodiments, a lubrication layer 60 may be or include a suitable compliant material, such as a rubber layer 62 as shown in FIG. 6. In other embodiments, a lubrication layer 60 may, for example, include one or more bushings 64 or other suitable vibration isolators as shown in FIG. 7, which may in exemplary embodiments be formed from a rubber or alternatively may be formed from any suitable material. In still other embodiments, a lubrication layer 60 may include one or more bearings, such as ball bearings 66 as shown in FIG. 8.

A floating platform 30 according to the present disclosure may thus include one or more first plates 32 and second plates 34. Second plates 34 may generally connect together various of the first plates 32, thus forming an overall platform 30 as shown in FIG. 2 while facilitating relative movement of the first plates 32 and second plates 34 to reduce platform 30 stress during operation of the wind turbine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower for a wind turbine, comprising:
   a hollow shell defining an interior, the hollow shell extending generally along a longitudinal axis, the hollow shell comprising a plurality of legs and a plurality of walls, each of the plurality of walls disposed between and connected to neighboring legs of the plurality of legs; and a platform disposed in the interior and connected to the shell, the platform comprising:
a first plate fixedly connected to the shell; and
a second plate slideably connected to the first plate such that the first plate is slideable relative to the second plate in a plane generally transverse to the longitudinal axis.

2. The tower of claim 1, wherein the platfrom further comprises a bolt movably connecting the second plate to the first plate.

3. The tower of claim 2, wherein the bolt extents through a bore hold defined in the first plate and is threadably coupled to a threaded bore hole defined in the second plate, and wherein the bore hole defined in the first plate has a maximum diameter that is greater than a maximum diameter of the bolt.

4. The tower of claim 2, wherein the platform comprises a plurality of bolts.

5. The tower of claim 1, further comprising a lubrication layer disposed between the first plate and the second plate, the lubrication layer operable to reduce friction during relative movement of the first plate and second plate.

6. The tower of claim 5, wherein the lubrication layer comprises a rubber layer.

7. The tower of claim 5, wherein the lubrication layer comprises a plurality of bushings.

8. The tower of claim 5, wherein the lubrication layer comprises a plurality of bearings.

9. The tower of claim 1, wherein a portion of each leg is positioned radially outward from the plurality of walls.

10. The tower of claim 9, wherein the first plate is fixedly connected to one of the plurality of legs.

11. The tower of claim 1, wherein the platform comprises a plurality of first plates, and wherein the second plate is movably connected to at least two of the plurality of first plates.

12. The tower of claim 11, wherein the second plate is movably connected to each of the plurality of first plates.

13. The tower of claim 1, wherein the platform comprises a plurality of second plates.

14. The tower of claim 1, further comprising a plurality of platforms.

15. A wind turbine, comprising:
a nacelle;
a plurality of rotor blades;
a tower on which the nacelle is mounted, the tower comprising:
a hollow shell defining an interior, the hollow shell extending generally along a longitudinal axis, the hollow shell comprising a plurality of legs and a plurality of walls, each of the plurality of walls disposed between and connected to neighboring legs of the plurality of legs; and
a platform disposed in the interior and connected to the shell, the platform comprising:
a first plate fixedly connected to the shell; and
a second plate slideably connected to the first plate such that the first plate is sildeable relative to the second plate in a plane generally transverse to the longitudinal axis.

16. The wind turbine of claim 15, wherein the platform further comprises a bolt movably connecting the second plate to the first plate.

17. The wind turbine of claim 15, further comprising a lubrication layer disposed between the first plate and the second plate, the lubrication layer operable to reduce friction during relative movement of the first plate and second plate.

18. The wind turbine of claim 15, wherein a protion of each leg is positioned radially outward from the plurality of walls.

* * * * *